US010616780B2

(12) United States Patent
Chockalingam

(10) Patent No.: US 10,616,780 B2
(45) Date of Patent: *Apr. 7, 2020

(54) MOBILITY MANAGER DESTRUCTIVE TESTING

(71) Applicant: T-Mobile USA, Inc., Bellevue, WA (US)

(72) Inventor: Ramaswamy Chockalingam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,485

(22) Filed: Jul. 22, 2019

(65) Prior Publication Data

US 2019/0349793 A1 Nov. 14, 2019

Related U.S. Application Data

(63) Continuation of application No. 15/678,753, filed on Aug. 16, 2017, now Pat. No. 10,433,192.

(51) Int. Cl.
| | | |
|---|---|---|
| *H04B 17/00* | (2015.01) | |
| *H04W 24/04* | (2009.01) | |
| *H04W 64/00* | (2009.01) | |
| *H04W 24/06* | (2009.01) | |
| *H04L 29/08* | (2006.01) | |

(52) U.S. Cl.
CPC .............. *H04W 24/04* (2013.01); *H04L 67/12* (2013.01); *H04W 24/06* (2013.01); *H04W 64/006* (2013.01)

(58) Field of Classification Search
None
See application file for complete search history.

(56) References Cited

U.S. PATENT DOCUMENTS

| | | |
|---|---|---|
| 9,179,289 B2 | 11/2015 | Zisimopoulos et al. |
| 2005/0108257 A1* | 5/2005 | Ishii ...................... H04L 63/101 |
| 2010/0075678 A1* | 3/2010 | Akman .................. H04W 24/06 |
| | | 455/436 |

(Continued)

OTHER PUBLICATIONS

Office action for U.S. Appl. No. 15/678,753, dated Feb. 26, 2019, Chockalingam, "Mobility Manager Destructive Testing," 14 pages.

*Primary Examiner* — Sithu Ko
(74) *Attorney, Agent, or Firm* — Lee & Hayes, P.C.

(57) ABSTRACT

A mobility manager of a cellular communication network is tested using a test network. The test network has a mobility manager, multiple actual and simulated base stations, and multiple actual and simulated communication devices. To test one aspect of the mobility manager, the number of simulated base stations is increased to nearly the rated capacity of the mobility manager. In addition, simulated communication sessions are established, again so that the number of communication sessions is near the rated capacity of the mobility manager. Communications are then interrupted between the base stations and the mobility manager. Behavior of the mobility manager is monitored after the interruption to determine, among other things, how many communications sessions are lost as a result of the interruption.

20 Claims, 3 Drawing Sheets

(56) References Cited

U.S. PATENT DOCUMENTS

| | | | |
|---|---|---|---|
| 2012/0069737 A1* | 3/2012 | Vikberg | H04W 28/12 370/232 |
| 2013/0083650 A1* | 4/2013 | Taleb | H04W 8/30 370/218 |
| 2014/0059678 A1 | 2/2014 | Parker | |
| 2016/0277926 A1 | 9/2016 | Molina et al. | |
| 2017/0118706 A1 | 4/2017 | Wang et al. | |
| 2017/0180189 A1 | 6/2017 | Hosdurg et al. | |
| 2019/0059007 A1 | 2/2019 | Chockalingam | |

* cited by examiner

MOBILITY MANAGER DESTRUCTIVE TESTING

RELATED APPLICATION

This application is a continuation of and claims priority to U.S. patent application Ser. No. 15/678,753, filed on Aug. 16, 2017, the disclosure of which is incorporated by reference herein.

BACKGROUND

The telecom sector continues to see exponential growth in terms of the number of connected devices utilizing telecommunication networks. With trends like Internet of Things (IOT) and Bring your own device (BYOD), such growth is expected to continue. Notwithstanding the development of high throughput and high capacity wireless technologies, networks that support connected devices are being utilized to their limits due to the sheer number of connected devices utilizing the networks.

To ensure that these high service demands are met, network operators test their networks for operability and robustness. For example, a network can be "stress tested" for robustness by deliberately increasing network traffic in order to cause a corresponding increase in central processing unit (CPU) and memory usage on the network nodes. In order to successfully pass a stress test, a network node should not fail (e.g., power cycle) under stressed conditions.

Often, however, today's networks are not tested adequately to ensure full robustness. That is, today's networks are still vulnerable to failure in particular scenarios that aren't covered by existing testing methodologies, and a node failure can have a significant impact on a telecommunication network. For example, in certain situations a single node failure can cause upwards of thousands of outages, whereby many customers lose service on their devices. Without adequate testing methodologies, networks remain unstable and vulnerable to failure.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
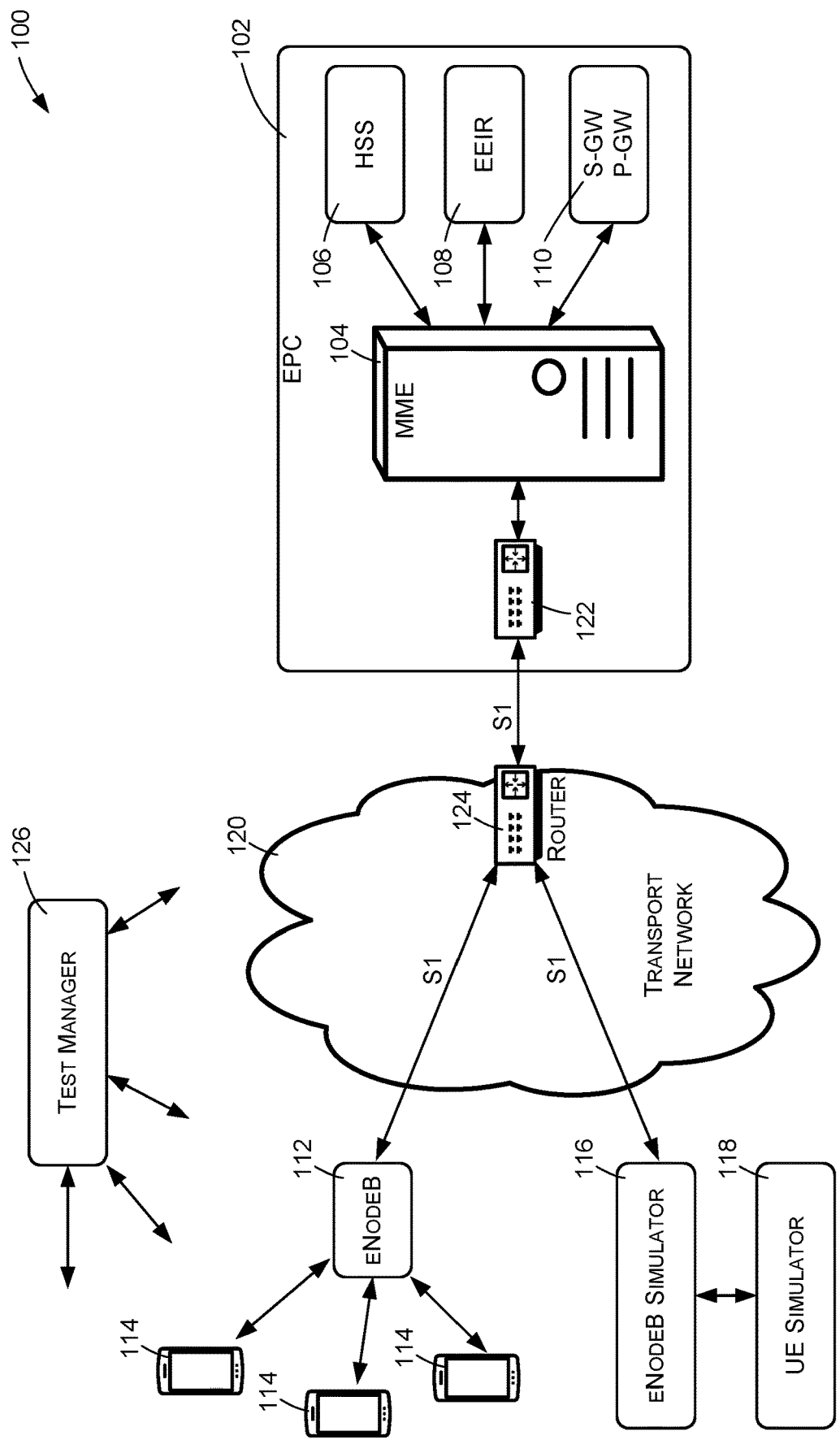
FIG. 1 is a block diagram of an environment for testing a mobility manager of a cellular communication system.

Described herein are techniques and systems for destructively testing nodes of a cellular communications system. Specifically, techniques are disclosed for destructively testing functions of a core network of a cellular communication system.

In a described embodiment, a test environment is set up to emulate a cellular communications system. The test environment may, for example, include components of a Long-Term Evolution (LTE) system, such as an Evolved Packet Core (EPC) and an IP Multimedia System (IMS). The test environment may also include multiple base stations such as Evolved Node Bs (eNodeBs), and any number of communication devices such as cellular telephones, smartphones, Internet of Things (IoT) devices, and so forth. In a described example, the techniques are used to test the performance of a Mobility Management Entity (MME) of the EPC, as well as other components that rely upon or interact with the MME.

An eNodeB or other base station of a radio access network (RAN) communicates with the MME through an IP-based communications network, which is referred to herein as a transport communication network. The transport communication network is implemented in part by multiple network routers. In LTE systems, communications between the eNodeBs and the MME are conducted over what is referred to as an S1 interface, which is carried over Stream Control Transmission Protocol (SCTP).

In certain embodiments, the test environment is configured so that the MME is supporting a large number of eNodeBs. The eNodeBs may include both actual and simulated eNodeBs. The number of eNodeBs can be selected to be a significant percentage of the highest number of eNodeBs that the MME is rated to support. In addition, actual or simulated communication devices are used to establish multiple communication sessions that are supported by the eNodeBs and the MME. The number of communication sessions may be selected to be a significant percentage of the highest number of communication sessions that the MME is rated to support.

With the MME loaded in this manner, the transport network router closest to the EPC is accessed and a setting is changed to temporarily interrupt communications between the eNodeBs and the MME. More specifically, an Access Control List (ACL) rule is added in the network router to block communications between the eNodeBs and the MME. After a predetermined time, such as 5 seconds, the ACL rule is removed or otherwise disabled and traffic is again allowed to flow between the eNodeBs and the MME.

The system is monitored during and after the communication interruption to determine whether the MME and related components perform satisfactorily in response to this condition. Ideally, the MME is able to implement fail-over procedures so that none of the simulated communication sessions are dropped or lost. If this is not the case, test instrumentation records the number of dropped communication sessions. In some embodiments, the number of dropped calls handled by each eNodeB is recorded, so that different performance metrics and test results may be generated for different types or makes of eNodeBs. Other activities of the system may also be monitored, such as by monitoring and recording whether the MME or any related components restart and ensuring that communications are maintained within the MME as well as between the MME and other components of the EPC.

FIG. 1 shows relevant components of an example Long-Term Evolution (LTE) communications test network 100 that is implemented for purposes of testing. In this example, the test network 100 implements an Evolved Packet Core (EPC) 102, which includes a Mobility Management Entity (MIME) 104, a Home Subscriber Service (HSS) 106, an Enhanced Equipment Identity Register (EEIR) 108, and one or more EPC gateways 110 such as a serving gateway (SGW) and a Packet Data gateway (P-GW). Both the test network 100 and the EPC 102 may have additional components that are not shown.

The MIME 104, also referred to more generally herein as a mobility manager, controls high-level operations of the test LTE network. The MIME 104 is responsible in part for setting up communication sessions with User Equipment (UE), for user/UE authentication, for security key management, and other activities.

The HSS 106 is a node that stores user-related information, including subscription information. The HSS 106 is also responsible for providing subscriptions for a particular subscriber to the mobility manager, for session setup, and for user/UE authentication.

The EEIR maintains a list of blacklisted devices and is used to prevent usage of wireless networks by blacklisted devices.

The S-GW and P-GW 110 route user plane traffic and data between ENodeBs and other system components. The P-GW provides the IP address for the User Equipment, and it connects the telecom internal network to the external Internet.

The test network 100 also has multiple eNodeBs 112, which are part of an LTE Radio Access Network (RAN). Each eNodeB 112 functions as a base station for communicating wirelessly with multiple UEs 114. The UEs 114 may include any types of wireless communication devices that are compatible with LTE technologies, such as mobile phones, smartphones, wearable devices, and various other types of devices that are configured to participate in communication sessions using the test network 100.

The eNodeBs may include actual, physical eNodeBs as well as simulated eNodeBs. The test network 100 may, for example, have one or more eNodeB simulators 116 that can be configured to emulate communications of multiple eNodeBs with the EPC 102.

Similarly, the UEs 114 may include actual, physical UEs as well as simulated UEs. The test network 100 may, for example, have one or more UE simulators 118 that can be configured to emulate communications of multiple UEs with the eNodeBs 112 and the EPC 102.

Generally, the test network 100 has multiple eNodeBs 112, and each eNodeB 112 supports multiple UEs 114. In certain embodiments, the eNodeBs 112 include at least one physical eNodeB and multiple simulated eNodeBs, and the UEs 114 include at least one physical UE and multiple simulated UEs. The one or more eNodeB simulators 116 can be configured to create any desired number of simulated eNodeBs so that the total number of actual and simulated eNodeBs is near the rated capacity of the MME to support, or exceeds the capacity of the MME 104. The one or more UE simulators 118 can be configured to create any desired number of simulated UEs so that the total number of actual and simulated UEs is near the rated capacity of the MME 104 to support, or exceeds the capacity of the MME 104.

The eNodeBs 112 communicate with the EPC 102 through what is referred to herein as a transport communication network 120. The transport communication network 120 may be packet-based network, such as an Internet Protocol (IP) network, in which data packets are routed through a sequence of network routers to a destination, which in this case is the EPC 102. The Internet is an example of such a packet-based network, although in the test environment of FIG. 1 the transport communication network 120 may be implemented within the test environment.

The MME 104 communicates using the transport communication network 120 by connecting to a default gateway 122, which in some cases may be considered to be part of the EPC 102 and/or the MME 104. The default gateway 122 communicates with a network router 124 of the transport communication network 120 in order to communicate through the transport communication network 120 with the eNodeBs 112 and the UEs 114.

In accordance with EPC standards, communications between an eNodeB 112 and the MME 104 are conducted using what is referred to as an S1 communications interface. The S1 interface protocol uses the underlying IP-based transport communication network 120 over the Stream Control Transmission Protocol (SCTP) as a transport layer for exchanging information between the eNodeBs and the MME 104. The applicable S1 protocol is set forth in 3GPP TS 36.413 and related standards.

The test network 100 may also have one or more test managers 126 that communicate with the various components shown in FIG. 1 in order to configure and/or monitor the operations of the components. For example, the test manager 126 may be a computer that communicates with the eNodeB simulator 116 and the UE simulator 118 to create simulated eNodeBs, UEs, and communication sessions with the EPC 102. During testing, the test manager 126 monitors the eNodeBs to record the numbers of communication sessions that are dropped or otherwise lost as a result of destructive testing. The test manager 126 may also communicate with the MME 104 to monitor its operations, and may as well communicate with the HSS 106, the EEIR 108, and the S/P-GW 110 to monitor their operations.

In some implementations, the test manager 126 may interact with the components of FIG. 1 using the Simple Network Management Protocol (SNMP), which allows the test manager 126 to configure, control, and query the components of the test network 100. In addition, the components may send messages or otherwise provide information to the test manager 126 using SNMP regarding status, faults, errors, requests, and so forth. In some cases, certain of the components may maintain event logs that can be accessed by the test manager 126.

Note that although the test manager 126 is shown as a single component, the functions of the test manager 126 may in practice be performed by multiple components.

In order to test certain aspects of the test network 100, the test manager 126 is configured to implement a destructive test in which a heavy load is put on the MME 104; communications between the eNodeBs and the MME are interrupted; and the resulting conditions, behaviors, and events are monitored. More specifically, the test manager 126 uses the eNodeB simulator 116 to create multiple simulated eNodeBs and the UE simulator 118 to create multiple simulated communication sessions. In some cases, the total number of eNodeBs, including actual and simulated eNodeBs, is configured so that it approaches the maximum rated capacity of the MME 104. For example, simulated eNodeBs may be added so that the total number of eNodeBs is 90% or more of the maximum rated capacity of the MME. In some cases, the total number of UEs, including actual and simulated UEs, is configured so that it approaches the maximum rated capacity of the MME 104, such as 90% or more of the eNodeB capacity of the MME 104. The number of communication sessions initiated through the MME 104 may also be configured to approach the maximum rated capacity of the MME 104 for communication session support, such as 90% or more of the rated capacity.

As a result of this high number of call sessions, the MME 104 may take measures such as dropping communication sessions, moving sessions to different MMEs, performing overload control drop actions, etc., all while maintaining connected sessions without any interruptions.

After placing a load on the MME 104 in this manner, the test manager 126 temporarily interrupts S1 communications between the eNodeBs and the MME 104. This can be done by creating an Access Control List (ACL) in the router 124 and adding a rule that blocks S1 traffic to and from the logical port used by S1 communications. In certain implementations, the S1 communications interface is carried by the Stream Control Transmission Protocol (SCTP) using port number 36412. Accordingly, the ACL rule blocks communications with the MME 104 that use port number 36412. More specifically, the rule may be configured to block traffic from the eNodeBs 112 to the MME 104. Creating and implementing the rule may be accomplished by interacting with or configuring the router 124 using commands and formats that may be specific to the particular type of router 124 being used.

After a predefined time period, such as 5 seconds as an example, the ACL rule is removed or otherwise disabled, restoring communications between the eNodeBs 112 and the MME 104.

In the embodiment shown by FIG. 1, the ACL rule is added to or configured in the router 124 of FIG. 1, where the router 124 is the is the last node in the paths from the eNodeBs 112 to the MME 104, prior to any router or gateway that might be considered part of the EPC 102 itself.

Ideally, upon an interruption in the communications between the eNodeBs 112 and the MME 104, the MME 104 would perform failover procedures. Call sessions would be maintained, such as by moving call sessions to the control of another MME. However, the MME 104 may in some cases fail catastrophically or exhibit other undesired behavior, and some or all of the communication sessions supported by the MME 104 may be dropped.

During and after the temporary interruption in communications, the test manager 126 and possibly other components shown in FIG. 1, such as the eNodeB simulator 116 and the UE simulator 118, monitor various events occurring within the test network 100. For example, the test manager 126 may monitor whether any communication sessions are dropped as a result of the interruption and if so, how many; whether the MME 104 or any other components of the EPC crash or restart during or as a result of the interruption; whether communications between the MME 104 and other components of the EPC 102 are maintained, such as between the MME 104 and the HSS 106, between the MME 104 and the EEIR 108, between the MME 104 and the S/P-GW; etc.; whether communication links within the MME 104 are maintained; and generally whether any faults, errors or other problems occur in the test network 100 because of the interruption and because of insufficient fault tolerance of the MME 104. Results of the test are recorded by the test manager 126 and can be analyzed as appropriate by network engineers. In addition, the eNodeBs and some of the EPC components may maintain event logs, and the event logs may also be analyzed to determine how the components reacted to the interruption in communications.

Figure 2:
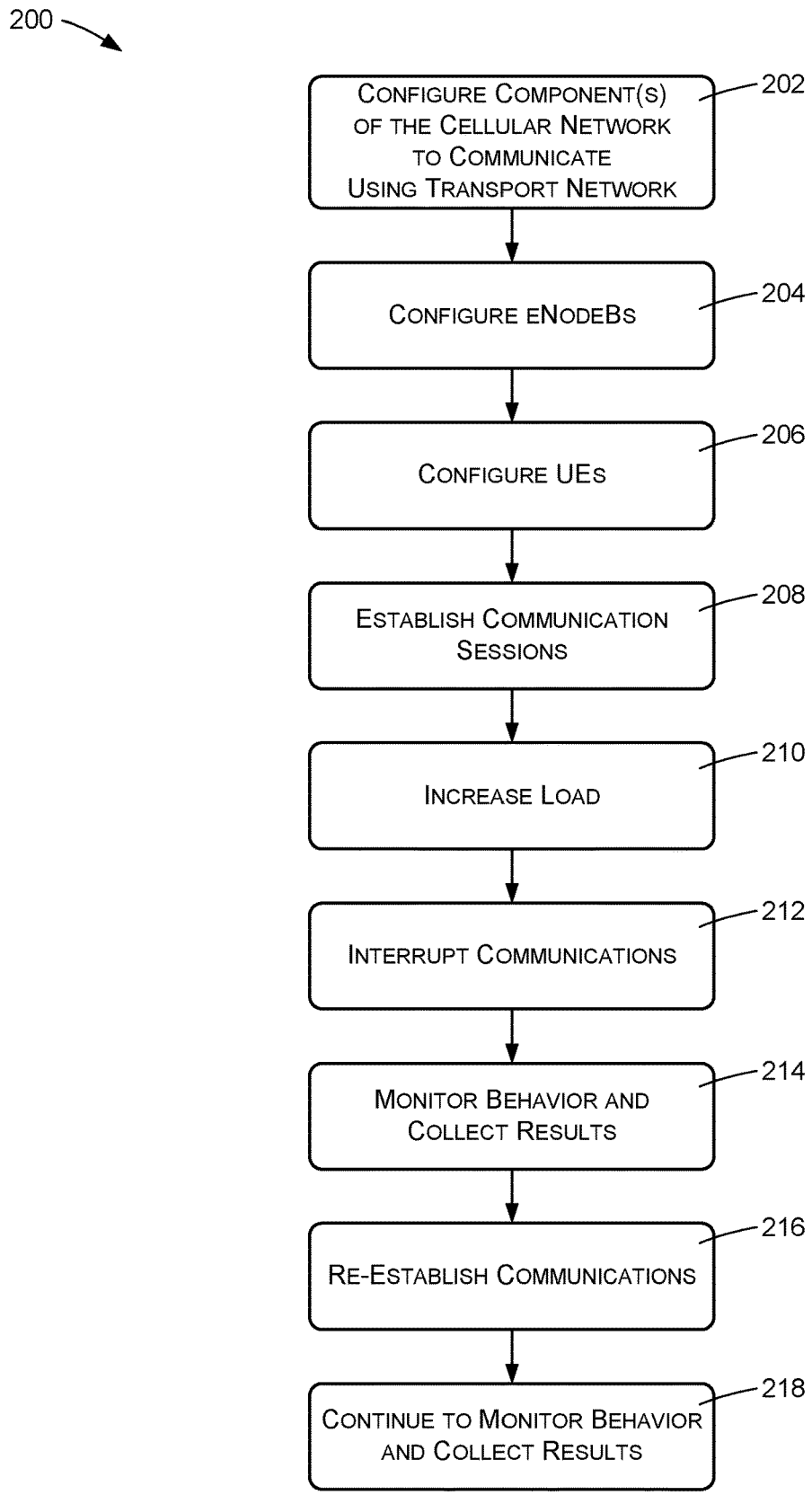
FIG. 2 is a flow diagram illustrating an example method for testing a mobility manager of a cellular communication system.

FIG. 2 shows an example method 200 that may be performed in the test network 100 of FIG. 1, as well as in other test environments. Note that although the test network 100 implements portions of an LTE cellular communications network, the method 200 may also be used for testing other types of cellular communication networks.

In the test network 100, the method 200 may be performed at least in part by the test manager 126, which may in practice comprise multiple components. In some cases, one or more of the actions of FIG. 2 may be performed manually, such as by a network engineer or technician, by accessing control interfaces of various components of the test network 100, by examining event logs of the components, etc.

An action 202 comprises configuring one or more components of the cellular communications network to communicate through the transport communication network 120. In the described embodiment, the action 202 comprises configuring a mobility manager, in this case the MME 104, to communicate through the transport communication network 120. This may involve connecting the MME 104 to the default gateway 122, and connecting the default gateway 122 to the router 124 of the transport communication network. In some embodiments, these connections may comprise wired Ethernet connections.

An action 204 comprises configuring multiple base stations of a radio access network (RAN), which in the illustrated embodiment comprise the eNodeBs 112, to communicate with the MME 104 through the transport communication network 120. The base stations may include simulated eNodeBs, and the action 204 may comprise creating such simulated eNodeBs using the eNodeB simulator 116. Communications to and within the transport communication network 120 may be implemented by a network of routers, and may include both physical and wireless communication links. Connection of each eNodeB to the transport communication network 120 may similarly be a wired or wireless connection.

An action 206 comprises configuring multiple communication devices, which in the illustrated embodiment comprise the UEs 114, to communicate with the MME 104 through eNodeBs 112 and through the transport communication network 120. The communication devices may include simulated UEs, and the action 206 may comprise creating such simulated UEs using the UE simulator 118. Communications between the eNodeBs 112 and the UEs 114 are performed through the S1 interface, in accordance with the S1 protocol.

An action 208 comprises establishing multiple communication sessions that use the MME 104 for mobility management. The communication sessions can be created using the UE simulator 118, by causing the UE emulator 118 to establish communication sessions using the simulated UEs.

An action 210 comprises increasing the load on the MIME 104 to near its maximum capacity, in terms of both the number of eNodeBs it is supporting and the number of communications sessions it is supporting. For example, the number of simulated eNodeBs can be increased to include at least 90% or 95% of the number of base stations that the mobility manager is rated to support. Similarly, number of communication sessions can be increased to include at least 90% or 95% of the number of communications sessions that the MME 104 is rated to support.

An action 212 comprises temporarily interrupting communications between the eNodeBs and the MME 104. In the described embodiment, this comprises enabling or otherwise applying an Access Control List (ACL) rule in the router 124, where the router 124 is the router of the transport communication network 120 that is nearest the EPC 102. The ACL rule is constructed so as to block S1 communications between the eNodeBs and the MME 104. For example, the ACL rule may be configured to block the port number 36412. This effectively blocks S1 communications without affecting communications that use other protocols.

An action 214 comprises monitoring the behavior of the test network and collecting test results. For example, the action 214 may comprise identifying how many of the multiple communication sessions are dropped by the MME 104 after the interruption in communications caused by application of the ACL rule.

The action 214 may include monitoring for various different events that may be caused the interruption in communications. Certain events or types of events may be recorded, such as restarts of the MME 104, losses of communications between internal function components of the MIME 104, losses of communications between the MME 104 and other components of the EPC such as the HSS 106, the EEIR 108, and the S/P-GW 110, etc. Certain of these events may cause SNMP messages to be sent to the test manager 126, identifying the events. In other cases, the test manager 126 may query the various components and/or examine event logs of the components in order to identify events.

An action 216 comprises re-establishing communications between the eNodeBs and the MME 104, such as by removing or disabling the ACL rule. The interruption may be for a relatively short duration, such as 5 seconds, after which the action 216 is performed of re-establishing the communications.

An action 218 may comprise continuing to monitor behavior and collect test results after communications have been re-established between the eNodeBs and the MME 104.

Figure 3:
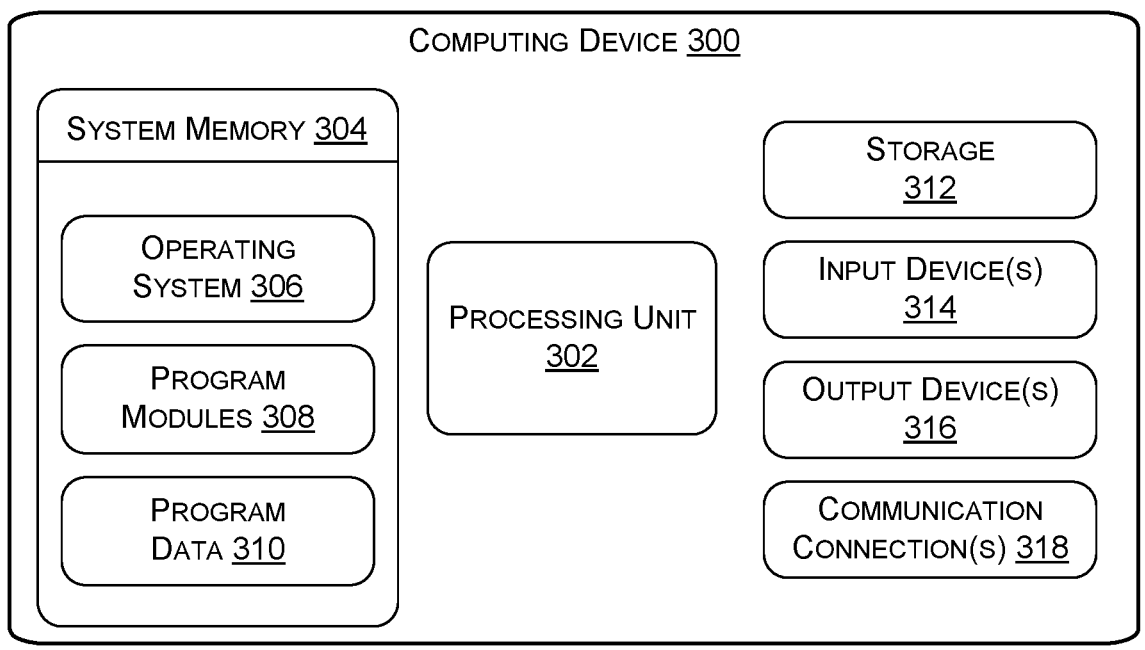
FIG. 3 is a block diagram of an example computing device, one or more of which may be used to implement components of the environment shown by FIG. 1.

FIG. 3 is a block diagram of an illustrative computing device 300 that might be used to implement various components or functions of the test network 100, such as servers, routers, gateways, administrative components, etc. For example, one or more computing devices 300 may be used to implement the test manager 126, the MIME 104, the eNodeB simulator 116, the UE Simulator 118, etc.

In various embodiments, the computing device 300 may include at least one processing unit 302 and system memory 304. Depending on the exact configuration and type of computing device, the system memory 304 may be volatile (such as RAM), non-volatile (such as ROM, flash memory, etc.) or some combination of the two. The system memory 304 may include an operating system 306, one or more program modules 308, and may include program data 310.

The computing device 300 may also include additional data storage 312 (removable and/or non-removable) such as, for example, magnetic disks, optical disks, or tape.

Non-transitory computer storage media of the computing device 300 may include volatile and nonvolatile, removable and non-removable media implemented in any method or technology for storage of information, such as computer readable instructions, data structures, program modules, or other data. The system memory 304 and storage 312 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 300. Any such non-transitory computer-readable storage media may be part of the computing device 300.

In various embodiment, any or all of the system memory 304 and storage 312 may store programming instructions which, when executed by the processing unit 302, implement some or all of the function functionality described above as being implemented by the test manager 126 and/or any components of the test network 100.

The computing device 300 may also have input device(s) 314 such as a keyboard, a mouse, a touch-sensitive display, voice input device, etc. Output device(s) 316 such as a display, speakers, a printer, etc. may also be included. The computing device 300 may also contain communication connections 318 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A communications test network for testing a network core of a cellular communications network, the communications test network comprising:
   a network router configured to provide communications through a transport communication network;
   a mobility manager configured to communicate through the network router over the transport communication network;
   multiple base stations configured to communicate with the mobility manager through the transport communication network;
   multiple communication devices configured to (a) communicate with the mobility manager through the base stations and (b) establish multiple communication sessions that use the mobility manager; and
   a test manager configured to (a) apply a setting in the network router that interrupts communications between the multiple base stations and the mobility manager, the setting including blocking communications through a logical port used for the communications between the mobility manager and the multiple base stations and (b) identify how many of the multiple communication sessions are dropped after applying the setting, and (c) detect one or more events occurring within the cellular communications network after applying the setting, the one or more events including at least one of a loss of communications between internal functions of the mobility manager or a loss of communications between the mobility manager and components other than the base stations.

2. The communications test network of claim 1, wherein the one or more events further include
   a restart of the mobility manager.

3. The communications test network of claim 1, wherein applying the setting comprises applying an Access Control List (ACL) rule.

4. The communications test network of claim 1, wherein the multiple base stations include at least 90% of the number of base stations that the mobility manager is rated to support.

5. The communications test network of claim 1, wherein the multiple communication sessions are of a number that is at least 90% of the number of communication sessions that the mobility manager is rated to support.

6. The communications test network of claim 1, wherein the multiple communication devices comprise multiple simulated communication devices.

7. The communications test network of claim 1, wherein:
   the mobility manager comprises a Mobility Management Entity (MME) of an Evolved Packet Core (EPC); and
   the base stations comprise Evolved Node Bs (eNodeBs).

8. The communications test network of claim 7, wherein:
   communications between the eNodeBs and the MME use an S1 communication protocol; and the setting is based on applying an Access Control List (ACL) rule including blocking the communications through the logical port used by the S1 communications protocol.

9. A method of testing a cellular communications network, the method comprising:
configuring a Mobility Management Entity (MME) of an Evolved Packet Core (EPC) to communicate through a transport communication network;
configuring multiple Evolved Node Bs (eNodeBs) to communicate with the MME through the transport communication network;
configuring multiple communication devices to (a) access the MME through the multiple eNodeBs and (b) establish multiple communication sessions using the MME;
applying a setting in a network router of the transport communication network that interrupts communications between the multiple eNodeBs and the MME, the setting including blocking communications through a logical port used by the communications between the multiple eNodeBs and the MME;
determining how many of the multiple communication sessions are dropped after applying the setting, and
detecting one or more events occurring within the cellular communications network after applying the setting, the one or more events including at least one of:
a loss of communications between internal functions of the mobility manager; or
a loss of communications between the mobility manager and components other than the base stations.

10. The method of claim 9, wherein applying the setting comprises applying an Access Control List (ACL) rule.

11. The method of claim 9, further comprising determining whether the MME restarts after interrupting the communications.

12. The method of claim 9, wherein:
communications between the eNodeBs and the MME use an S1 communication protocol; and
the setting is based on applying an Access Control List (ACL) rule including blocking the communications through the logical port used by the S1 communications protocol.

13. A method of testing a cellular communications network, the method comprising:
configuring one or more components of the cellular communications network to communicate through a transport communication network;
configuring a radio access network of the cellular communications network to communicate with the one or more components through the transport communication network;
configuring multiple communication devices to (a) access the one or more components through the radio access network and (b) establish multiple communication sessions using the one or more components;
applying a setting in a network router of the transport communication network that interrupts communications between the radio access network and the one or more components, the setting including blocking communications through a logical port used for the communications between the radio access network and the one or more components; and
detecting one or more events occurring within the cellular communications network after applying the setting, the one or more events including at least one of:
a loss of communications between internal functions of the mobility manager; or
a loss of communications between the mobility manager and components other than the base stations.

14. The method of claim 13, wherein detecting the one or more events comprises determining whether one or more of the communication sessions are dropped after applying the setting.

15. The method of claim 13, wherein the one or more events further includes:
a restart of a mobility manager.

16. The method of claim 13, wherein the one or more components comprise an Evolved Packet Core (EPC).

17. The method of claim 13, wherein the radio access network comprises multiple Evolved Node Bs (eNodeBs) and the one or more components comprise a Mobility Management Entity (MME) of an Evolved Packet Core (EPC).

18. The method of claim 13, wherein:
the communications between the radio access network and the one or more components use an S1 communication protocol; and
the setting is based on applying an Access Control List (ACL) rule including blocking the communications through the logical ports used by the S1 communication protocol.

19. The method of claim 13, wherein the radio access network comprises multiple simulated base stations.

20. The method of claim 13, wherein the multiple communication devices include multiple simulated communication devices.

* * * * *